United States Patent [19]

Hannah, Jr.

[11] 3,912,150
[45] Oct. 14, 1975

[54] BACKING RINGS FOR WELDED PIPE JOINTS
[75] Inventor: James P. Hannah, Jr., Gillette, N.J.
[73] Assignee: Foster Wheeler Energy Corporation, Livingston, N.J.
[22] Filed: Oct. 4, 1974
[21] Appl. No.: 512,834

[52] U.S. Cl................................ 228/50; 228/216
[51] Int. Cl.$^2$........................................ B23K 5/22
[58] Field of Search.................. 29/491, 483, 473.7; 228/50, 56, 57; 113/116 W, 116 UT

[56] References Cited
UNITED STATES PATENTS
| | | | |
|---|---|---|---|
| 1,293,871 | 2/1919 | Murray | 113/116 W |
| 1,980,561 | 11/1934 | Wagner | 29/491 |
| 3,076,261 | 2/1963 | Christensen | 29/491 |

Primary Examiner—Al Lawrence Smith
Assistant Examiner—Margaret M. Joyce
Attorney, Agent, or Firm—John E. Wilson; Marvin A. Naigur; John P. De Luca

[57] ABSTRACT

A backing ring which allows a section of pipe to be axially and radially aligned between two adjacent pipes without disturbing the adjacent pipes. The pipes have at one of their ends longitudinal slots and the backing rings have radially extending pins so that the backing ring can be positioned in one end of the pipe to position the pins within the slots to permit a section of pipe to be moved laterally into position so that the backing ring can be moved axially to take the pin out of the slot and then rotated so that the pipes are spaced a proper distance apart and concentric with each other so that an effective weld joint can be made.

8 Claims, 6 Drawing Figures

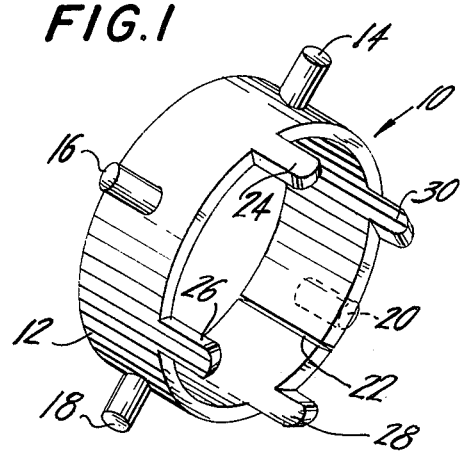
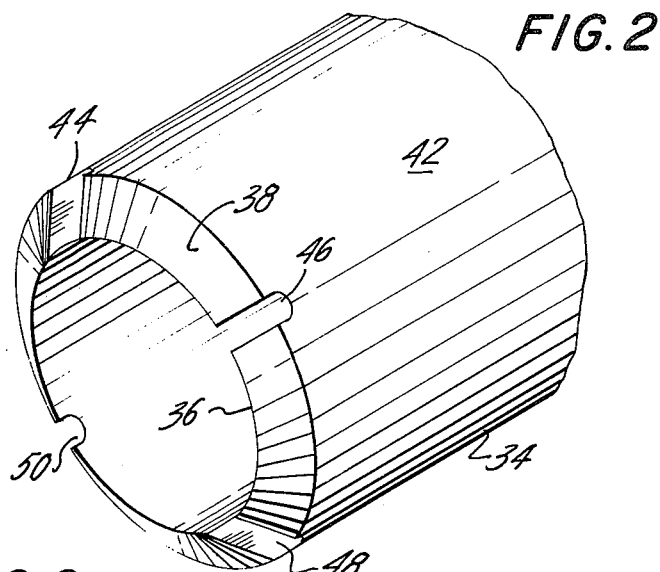
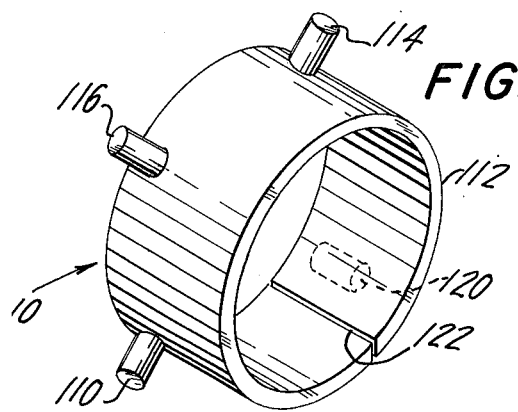
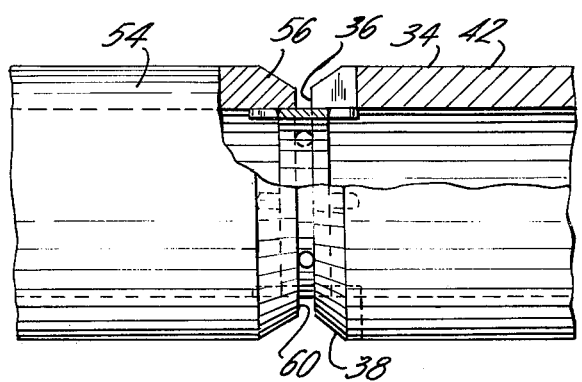
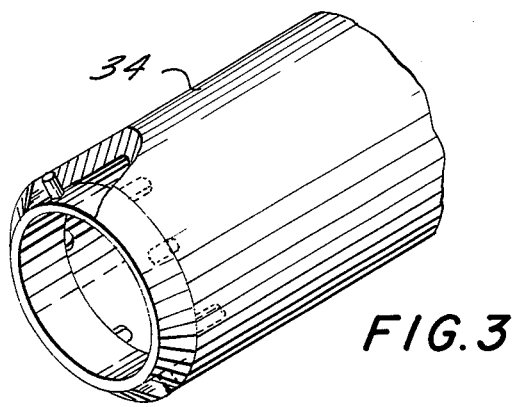
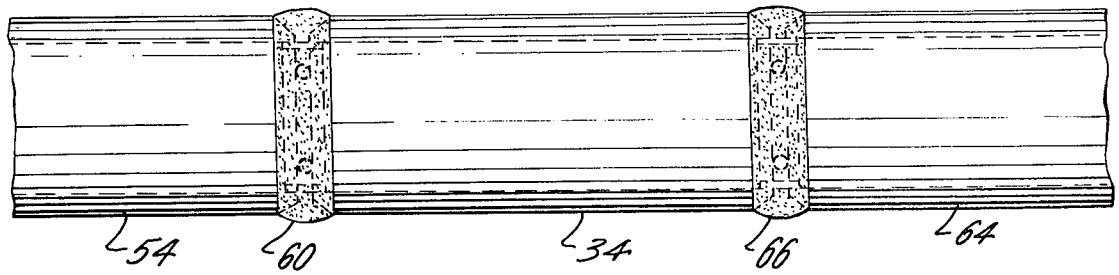

ent invention.

BACKING RINGS FOR WELDED PIPE JOINTS

BACKGROUND OF THE INVENTION

It is often necessary to weld pipes end to end. If a superior weld joint is to be made between the ends of the pipe, they must be properly aligned. This can be done by using a jig which firmly grasps both pipes and holds them so that they are properly spaced and radially aligned in preparation for the making of a circumferential weld. Jigs take up considerable space and often cannot be used when there is little working space around the pipes. Further, jigs do not always properly align the pipes because they must be secured on the pipes at some distance from the portions to be welded.

Backing rings provide an alternate means of aligning pipes. A backing ring is less bulky than a jig and can engage the pipes at the ends which are to be butt welded together to assure precision alignment. Typically, a backing ring is inserted in the end of a pipe so that it projects outwardly and another pipe is moved axially so that its end slides over the backing ring. The pipes are then aligned axially so that they can be welded together.

Backing rings have certain disadvantages. For one, the pipes often have to be moved axially a considerable distance to bring them into alignment. This is not possible when a pipe must be fitted between two sections which cannot be moved axially. In addition, many backing rings do not provide for the proper axial spacing of the pipe so that a superior weld can be made.

SUMMARY OF THE INVENTION

It is an object of the present invention to overcome drawbacks found in the prior art such as those discussed above. Accordingly, a section of pipe having several slots in its side wall adjacent to the end thereof is provided with a backing ring which fits in the end of said pipe and which has several pins extending radially outward which can fit within said slots so that another pipe can be moved laterally so that it is approximately coaxial with said one pipe and the backing ring moved axially to bring said pins out of said slots and then moved circumferentially with respect to the two pipes each of which is made to abut the pins so that they are properly spaced axially and coaxial with each other so that a proper weld can be made.

BRIEF DESCRIPTION OF THE DRAWINGS

FIG. 1 is a view in perspective of a backing ring made in accordance with the present invention;

FIG. 2 is a fragmentary view showing an end of a pipe slotted in accordance with the present invention;

FIG. 3 is a fragmentary view showing the end of the pipe shown in FIG. 2 with the backing ring of FIG. 1 inserted therein;

FIG. 4 is a view, partly in section, showing two sections of pipe properly aligned and spaced by the backing ring of FIG. 1;

FIG. 5 is a view showing several sections of pipe after they have been welded in accordance with the present invention; and FIG. 6 is a view in perspective of a backing ring made in accordance with a second embodiment of the present invention.

DETAILED DESCRIPTION OF THE PREFERRED EMBODIMENTS

There is shown in FIG. 1 a backing ring indicated generally as 10 which includes a ring 12 and four pins, 14, 16, 18 and 20 equally spaced about the circumference of the ring 12 fixedly secured to the ring 72. The pins 14, 16, 18 and 20 are generally cylindrical and have axes which all lie in the same plane, and extend radially outward from the ring 12.

The backing ring 10 also includes a plurality of tabs 24, 26, 28 and 30 which are of a number equal to the number of pins 14, 16, 18 and 20. The tabs 24, 26, 28 and 30 extend axially from one end of the backing ring 10. The ring 12 is split having a gap 22. This allows the ring to contract as it is placed in the end of a pipe section to snugly fit therein, as will presently appear. The tabs 24, 26, 28 and 30 are each over its length the same distance from the axis of the backing ring 12 as is the ring 10.

FIG. 2 shows the end of a section of pipe 34. The butt end 36 of the pipe 34 is tapered at 38 over the outer portion thereof. The inner portion 40 is not tapered so that the end surface thereof extends in a plane generally perpendicular to the axis of the pipe 34.

The section of pipe 34 also has in its sidewall 42 a number of slots 44, 46, 48 and 50 which are circumferentially spaced so that they are equi-distant from each other. The number of slots 44, 46, 48 and 50 is the same as the number of pins 14, 16, 18 and 20 and the number of tabs 24, 26, 28 and 30. Each of the slots 44–50 extends through the side wall 42 of the section of pipe 34.

When it is desired to weld the section of pipe 34 to another pipe, the backing ring is inserted in the end thereof by moving the ring axially so that the pins 14, 16, 18, and 20 each move axially into one of the slots 44–50. The gap 22 allows the ring 12 to contract slightly to move into the end of the pipe and to thereafter expand against the inside surface of the pipe. The ring 10 is made of such a width and the slots 44–50 are made of such a length so that the pins 14–20 can be moved inward until the ring 12 is substantially entirely within the pipe 34. The pipe section 34 is then moved so that it is more or less concentric with respect to another pipe section such as the one 54 shown in FIG. 4. The backing ring is then moved axially toward the pipe section 54 by exerting an axial force on the ends of the one or more of the pins 14–20 until the pins are completely out of the slots 44–50.

The pipe section 54 has a butt end 56 which is tapered at the outer portion 58 thereof and has an inner portion 60 having a surface lying in a plane perpendicular to the axis of the pipe 54. In other words the end 56 of the section 54 is similar to the end 36 of the pipe section 34. The pins 14–20 when moved axially out of their slots are then moved circumferentially in the space between the inner portion 40 of the end 36 of the pipe section 34 and the inner portion 60 of the end 56 of the pipe 54. The pins 14–20 are of such diameter that they will space the pipes 34 and 54 properly for welding when the portions 40 and 60 abut the pins 14–20. The ring 12 will assure that the pipe sections 34 and 54 are concentric and that they are radially aligned.

The tabs 24–30 are positioned so that the pins 14–20 can be rotated so that the tabs 24–30 cover each of the slots 44–50 while each of the pins 14–20 is between two of the slots 44–50. This is shown in FIG. 4.

After the backing ring 12 has been used to properly space and align the pipe section 34 with the pipe section 54, a weld 62 can be made around the butt ends in the space between the tapered outer portions 38 and 58. The pipes are first spot welded to hold them in exact alignment while the pins 14–20 are removed as, for example, by a hammer. Then with the ring 12 expanding against the inside of the pipes at their ends a circumferential weld is made and the slots 44–50 filled with weld material over the tabs 24–30.

Since the pipes 34 can be moved laterally without being moved axially to any substantial extent to be brought into alignment with the pipe 54, it is possible that the pipe 34 could be placed between the pipes 54 and 64 as shown in FIG. 5. Another backing ring 10 could be used to align the pipe 34 and 54 so that a weld 66 could be made.

If the pipe 34 must be placed between two pipes which are not slotted, it is still possible to use two backing rings 10 to align both ends, merely by properly slotting both ends of the pipe 34 and inserting the backing rings 10 so that the tabs 24–30 point into the center of the pipe section at both ends.

FIG. 6 shows a backing ring 110 which has a ring 112 which is considerably wider than is the ring 12 of the embodiment of FIG. 1. It has pins 114, 116, 118 and 120 which are equi-distantly spaced about the circumference of the ring 112. The ring 112 is a split ring having a gap 122 which allows the ring to flex so that it can contract to be placed within the end of a pipe and thereafter to expand so that it snugly engages against the inner surface of the pipe. The ring 110 is considerably wider than is the ring 10 of the embodiment of FIG. 1. It does not have tabs, such as the tabs 24, 26, 28 and 30, but covers the slots 44, 46, 48 and 50 of a pipe section 34 when placed in an end thereof even when its pins are moved axially out of those slots to abut the butt end 36 because of its width. The pins 114, 116, 118 and 120 are placed much closer to one side of the ring 112 than the other so that when the pins are each within one of the slots 44–50 the side of the ring 112 closest to the pin will be flush with the butt end 36 of the pipe section 34 so that the pipe section 34 can be moved laterally into place with respect to a pipe section it is to be welded to. Thereafter the pins 114 through 120 are moved axially out of the slots 44–50 and then moved circumferentially to rotate the backing ring 110 and allow the pins 114 through 120 each to be positioned between two of the slots 44–50 and abutting the butt end 36. Because of the width of the ring it will cover the slots even when the pins 114, 116, 118 and 120 are between the pipe sections to be welded together.

Thereafter tack welds are made about the circumference of the adjoining pipes and the pins 114 through 120 are each removed as by knocking off with a hammer and a weld around the two pipes between the ends thereof is completed. The slots 44 through 50 are then filled in so that a tight joint is created.

The foregoing describes but one preferred embodiment of the invention, other embodiments being possible without exceeding the scope thereof as defined in the following claims.

What is claimed is:

1. In combination:
   two pipe sections to be butt welded, one of said pipe sections having a slot in the side wall thereof extending from a butt end of said one pipe section,
   a ring having an outside diameter no greater than the inside diameter of said one pipe section;
   a tab projecting axially from said ring; and
   a pin fixedly secured to and projecting radially outward from said ring whereby said ring can be positioned within said one pipe section so that said pin is within said slot and after said pipe section is aligned so that it is substantially coaxial with the other of said pipe sections, said pin can be moved out of said slot to move said ring axially and then moved circumferentially so that said pipe sections can be moved closer together until they abutt said pins so that said pipe sections are aligned axially and radially and a weld can be made around said pipe sections between the ends thereof to form a butt joint.

2. The combination defined in claim 1 further comprising a tab, said tab projecting axially from said ring and spaced circumferentially from said pin so that when said pin is moved out of said slot and moved circumferentially said tab can be positioned to cover said slot over the bottom thereof and thereby prevent leakage through said slot after said pipe sections are welded together.

3. The combination defined in claim 2 wherein said slot is one of a number of slots, said pin is one of a number of pins and said tab is one of a number of tabs said pins being of the same number as said slots and said tabs, said pins being equi-distant from each other, said tabs being equi-distant from each other and said slots being equi-distant from each other with said tabs being positioned equi-distant from each other with said tabs being positioned between said pins so that when said pins are moved circumferentially said tabs will each cover the bottom of one of said slots.

4. The combination defined in claim 3 wherein said pins are each cylindrical.

5. The combination defined in claim 3 wherein the end of each of said pipe sections has an inner surface which is annular in configuration and lying in a plane perpendicular to the axis of said pipe and an outer portion which is tapered.

6. The combination defined in claim 1 wherein said pin is closer to one side of said ring than the other side thereof, the distance between said pin and said other side being sufficient that when said pin is moved out of said slot and against the butt end of said pipe section adjacent to said slot said slot will be covered by said ring.

7. The combination defined in claim 6 wherein said pin is one of a number of pins and said slot is one of a number of slots equal in number to said pins.

8. The combination defined in claim 7 wherein said pins are equi-distantly spaced about said ring and said slots are equi-distantly spaced about the circumference of said pipe.

* * * * *